United States Patent
O'Brien et al.

(10) Patent No.: US 12,397,312 B2
(45) Date of Patent: Aug. 26, 2025

(54) MACHINE MOTION CAM TRACK FOLLOWER

(71) Applicant: General Electric Company, Schenectady, NY (US)

(72) Inventors: Kristen O'Brien, Greenville, SC (US); Jacob A. Salm, Greenville, SC (US); Craig Sarratt, Greenville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 362 days.

(21) Appl. No.: 18/150,883

(22) Filed: Jan. 6, 2023

(65) Prior Publication Data

US 2024/0226945 A1    Jul. 11, 2024

(51) Int. Cl.
B05B 15/68 (2018.01)
F16H 25/06 (2006.01)

(52) U.S. Cl.
CPC ............. B05B 15/68 (2018.02); F16H 25/06 (2013.01)

(58) Field of Classification Search
CPC ................................ B05B 15/68; F16H 25/06
See application file for complete search history.

(56) References Cited

U.S. PATENT DOCUMENTS

| | | | |
|---|---|---|---|
| 2,507,640 A | 5/1950 | MacDonald | |
| 3,696,685 A | 10/1972 | Steele | |
| 5,522,706 A | 6/1996 | Mannava et al. | |
| 5,846,054 A | 12/1998 | Mannava et al. | |
| 6,267,558 B1 | 7/2001 | Dingwell et al. | |
| 7,515,547 B2 | 4/2009 | McCann et al. | |
| 7,516,547 B2 | 4/2009 | McCann et al. | |
| 9,453,576 B2 | 9/2016 | Schumann et al. | |
| 9,856,734 B2 | 1/2018 | Salm et al. | |
| 2006/0101883 A1* | 5/2006 | Garza | B24C 1/10 72/53 |
| 2008/0268757 A1 | 10/2008 | Mase et al. | |
| 2013/0180952 A1* | 7/2013 | Berkebile | C23C 10/04 216/41 |

(Continued)

FOREIGN PATENT DOCUMENTS

| | | | | |
|---|---|---|---|---|
| CN | 106140549 A | * | 11/2016 | ......... B05B 13/0228 |
| EP | 0423041 A1 | * | 4/1991 | ......... B05B 13/0421 |

(Continued)

OTHER PUBLICATIONS

Machine translation of CN 106140549 A, obtained from FIT database (Year: 2016).*

(Continued)

*Primary Examiner* — Thomas C Diaz
(74) *Attorney, Agent, or Firm* — Eversheds Sutherland (US) LLP

(57) ABSTRACT

The present application provides a variable spray system for spraying a workpiece with a spray-able material at different angles. The variable spray system may include a linear actuator, a cam follower assembly, and a spray arm assembly. The linear actuator drives the cam follower assembly such that the cam follower assembly positions the spray arm assembly at a first angle with respect to the workpiece in a first stroke of the linear actuator and positions the spray arm assembly at a second angle with respect to the workpiece in a second stroke of the linear actuator.

20 Claims, 4 Drawing Sheets

(56) References Cited

U.S. PATENT DOCUMENTS

| | | |
|---|---|---|
| 2015/0031272 A1 | 1/2015 | Fulton et al. |
| 2015/0298288 A1 | 10/2015 | Fulton et al. |
| 2015/0375322 A1 | 12/2015 | Salm et al. |
| 2016/0141200 A1 | 5/2016 | Takano |

FOREIGN PATENT DOCUMENTS

| | | |
|---|---|---|
| KR | 10-1381357 B1 | 4/2014 |
| KR | 10-2113496 B1 | 5/2020 |

OTHER PUBLICATIONS

International Search Report and Written Opinion, PCT/US2023/086337, dated May 1, 2024 (8 pp.).

\* cited by examiner

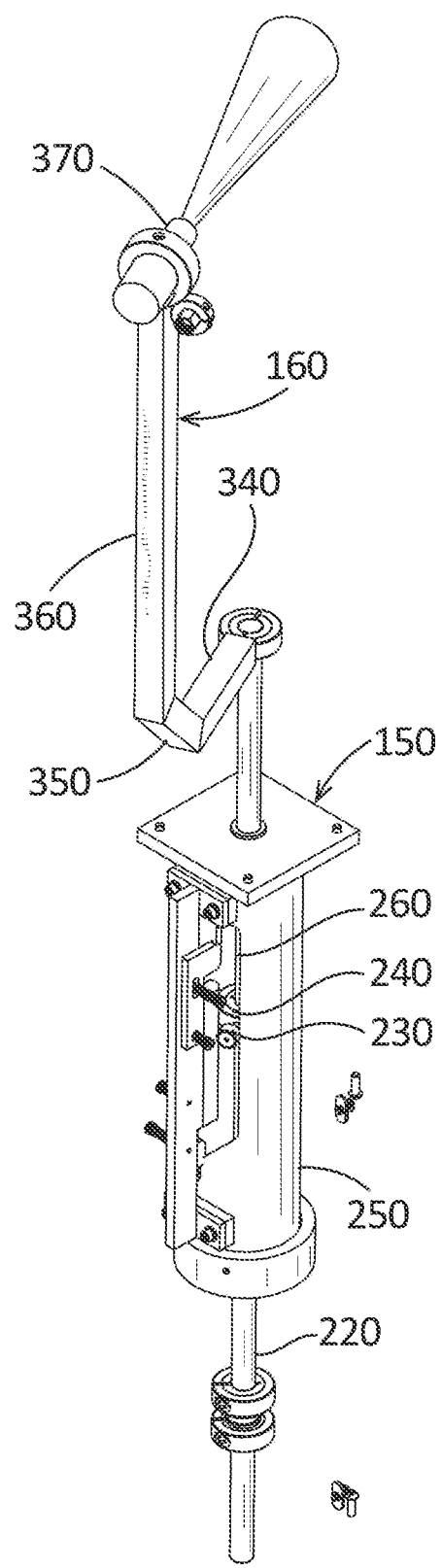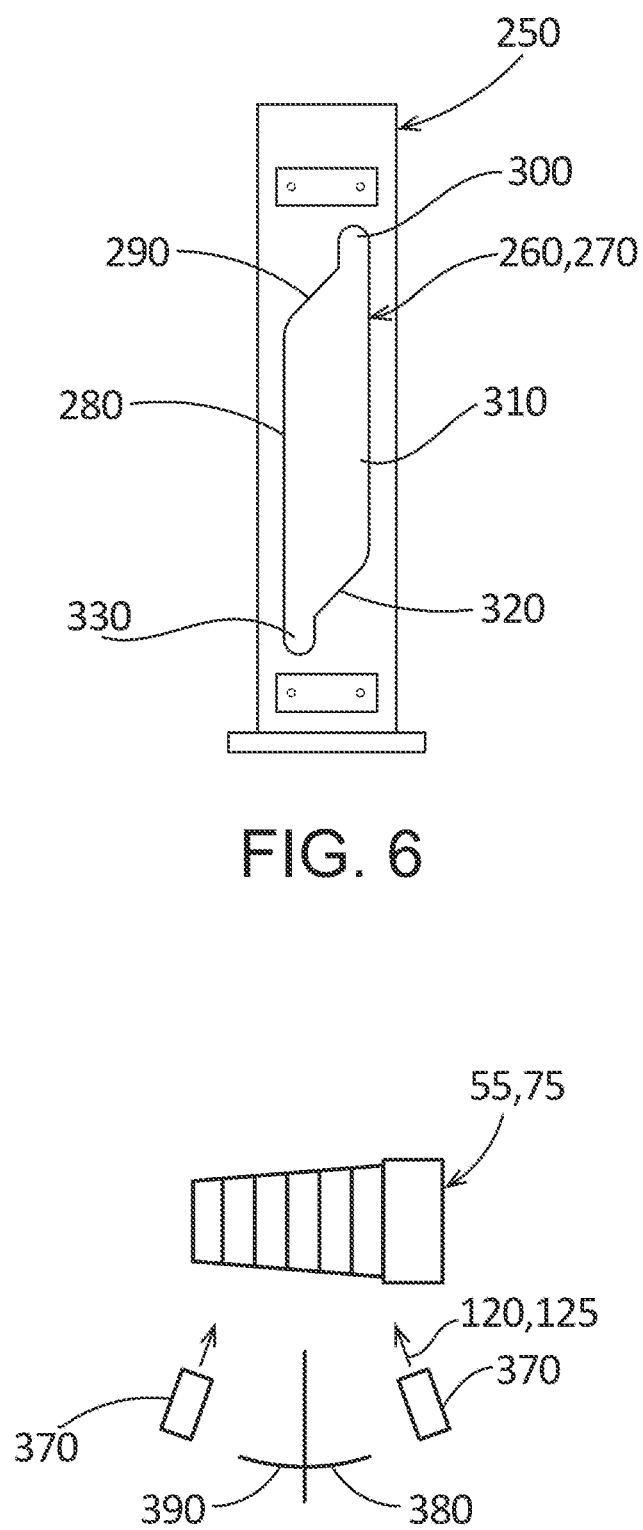
FIG. 5
FIG. 6
FIG. 7

MACHINE MOTION CAM TRACK FOLLOWER

TECHNICAL FIELD

The present application and the resultant patent relate generally to methods and systems for performing repetitive tasks and more particularly relate to methods and systems for rotational and translational movement of a tool such as a shot peening tool for a turbine engine rotor blade.

BACKGROUND

Generally described, turbine engine rotor blades include an airfoil extending outwardly from a supporting platform and a dovetail. The dovetail is configured with axial lobes or tangs for mounting each blade in corresponding dovetail slots in the perimeter of a supporting rotor disk. During operation, energy is extracted from the hot combustion gases that flow past the turbine rotor blades which, in turn, rotate the supporting rotor disk for powering a compressor in a typical configuration. The rotor blades are subject to centrifugal loads during operation. These loads are carried radially inwardly through the supporting dovetails into the perimeter of the supporting rotor disk.

The turbine rotor blades are typically formed of high strength superalloy materials having enhanced strength at the elevated temperatures typically found in the turbine. To further enhance the strength of the turbine rotor blades, the various surfaces of the dovetails may be shot peened in one of the last manufacturing steps producing the blades. Shot peening is a process in which metal shot is discharged in a stream of pressurized air over the surface of a metal workpiece to plastically deform the surface layer thereof and introduce residual compressive stress therein. The residual compressive stress reduces the stresses experienced in the component during operation, such as in the rotating environment of the gas turbine engine.

Uniform shot peening of the entire turbine blade dovetail may provide maximum strength of the blade during operation and a correspondingly long service life. In order to ensure uniform coverage, many types of shot peening equipment use multiple nozzles positioned at varying angles. Each additional nozzle and the associated components, however, add to the overall cost, complexity, and efficiency of the equipment.

SUMMARY

The present application and the resultant patent thus provide a variable spray system for spraying a workpiece with a spray-able material at different angles. The variable spray system may include a linear actuator, a cam follower assembly, and a spray arm assembly. The linear actuator drives the cam follower assembly such that the cam follower assembly positions the spray arm assembly at a first angle with respect to the workpiece in a first stroke of the linear actuator and positions the spray arm assembly at a second angle with respect to the workpiece in a second stroke of the linear actuator. The workpiece may be a turbine blade dovetail and the spray-able material may be shot peen.

The present application and the resultant patent further provide a method of positioning a nozzle driven by a shaft of a cam follower assembly at different angles about a workpiece. The method may include the steps of driving the shaft in an upward direction, wherein driving the shaft in the upward direction causes the cam follower assembly to rotate the shaft and the nozzle in a first angle, and driving the shaft in a downward direction, wherein driving the shaft in the downward direction causes the cam follower assembly to rotate the shaft and the nozzle in a second angle.

The present application and the resultant patent further provide a variable spray system for spraying a dovetail of a rotor blade with shot peen at different angles. The variable spray system may include a linear actuator, a cam follower assembly, and a spray arm with a nozzle. The linear actuator drives the cam follower assembly such that the cam follower assembly positions the spray arm and the nozzle at a first angle with respect to the dovetail in a first stroke of the linear actuator and positions the spray arm and the nozzle at a second angle with respect to the dovetail in a second stroke of the linear actuator.

These and other features and improvements of this application and the resultant patent will become apparent to one of ordinary skill in the art upon review of the following detailed description when taken in conjunction with the several drawings and the appended claims.

BRIEF DESCRIPTION OF THE DRAWINGS

FIG. 5 is a perspective view of a cam follower assembly of the variable spray system of FIG. 3

FIG. 6 is a plan view of a cam track of the cam follower assembly of FIG. 5.

FIG. 7 is a schematic diagram of the spray nozzle of the variable spray system of FIG. 3 being positioned at different angles with respect to a workpiece.

DETAILED DESCRIPTION

Figure 1:
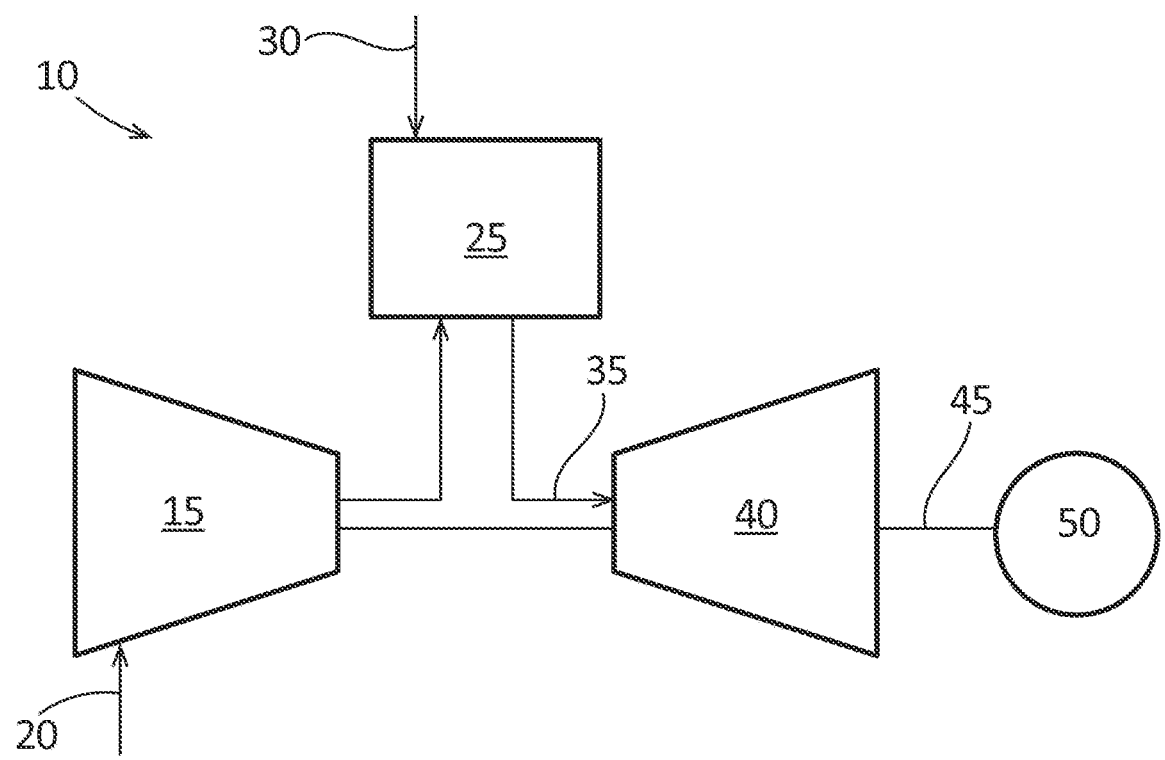
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 so as to produce mechanical work. The mechanical work produced in the turbine 40 drives the compressor 15 via a rotor shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like and may be part of a simple cycle or a combined cycle power generation system. The gas turbine engine 10 may have different configurations and may use other types of components. Other types of gas turbine engines also may be used herein. Multiple gas turbine engines, other types of turbines, and other types of power generation equipment also may be used herein together.

Figure 2:
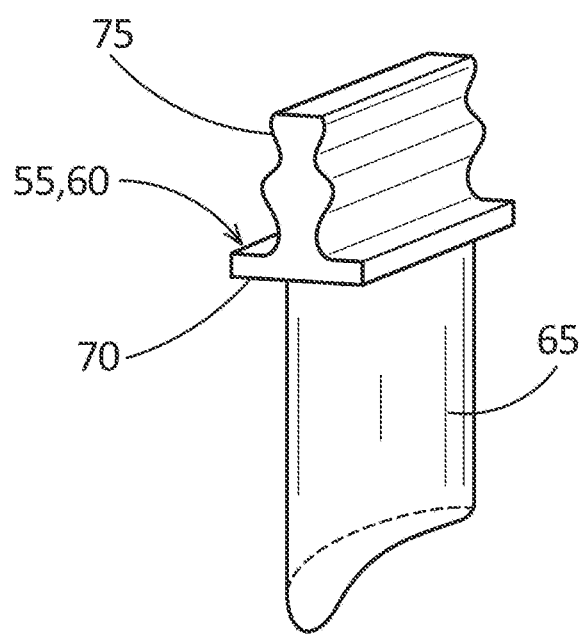
FIG. 2 is a perspective view of a turbine rotor blade.
Figure 3:
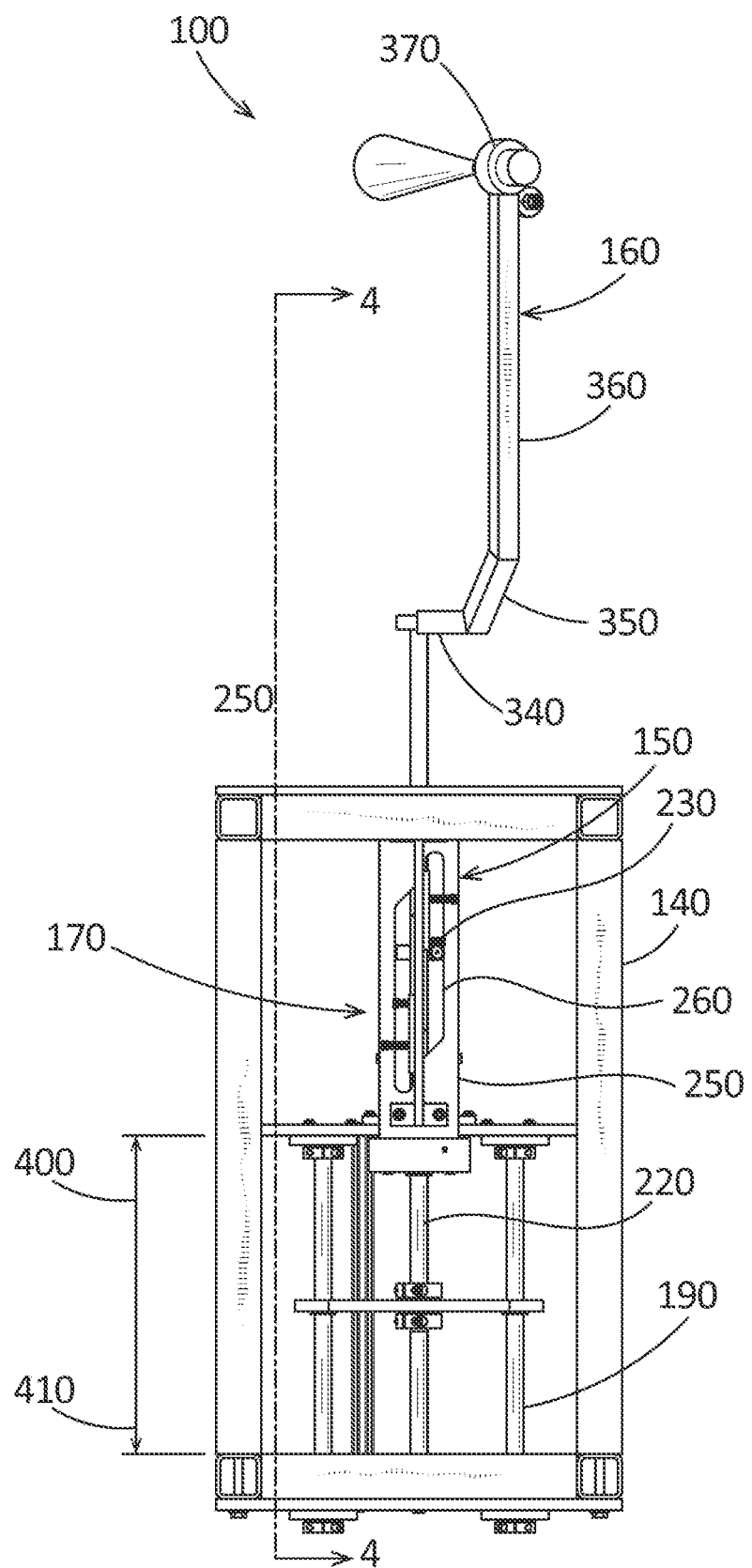
FIG. 3 is a side view of a variable spray system as may be described herein.
Figure 4:
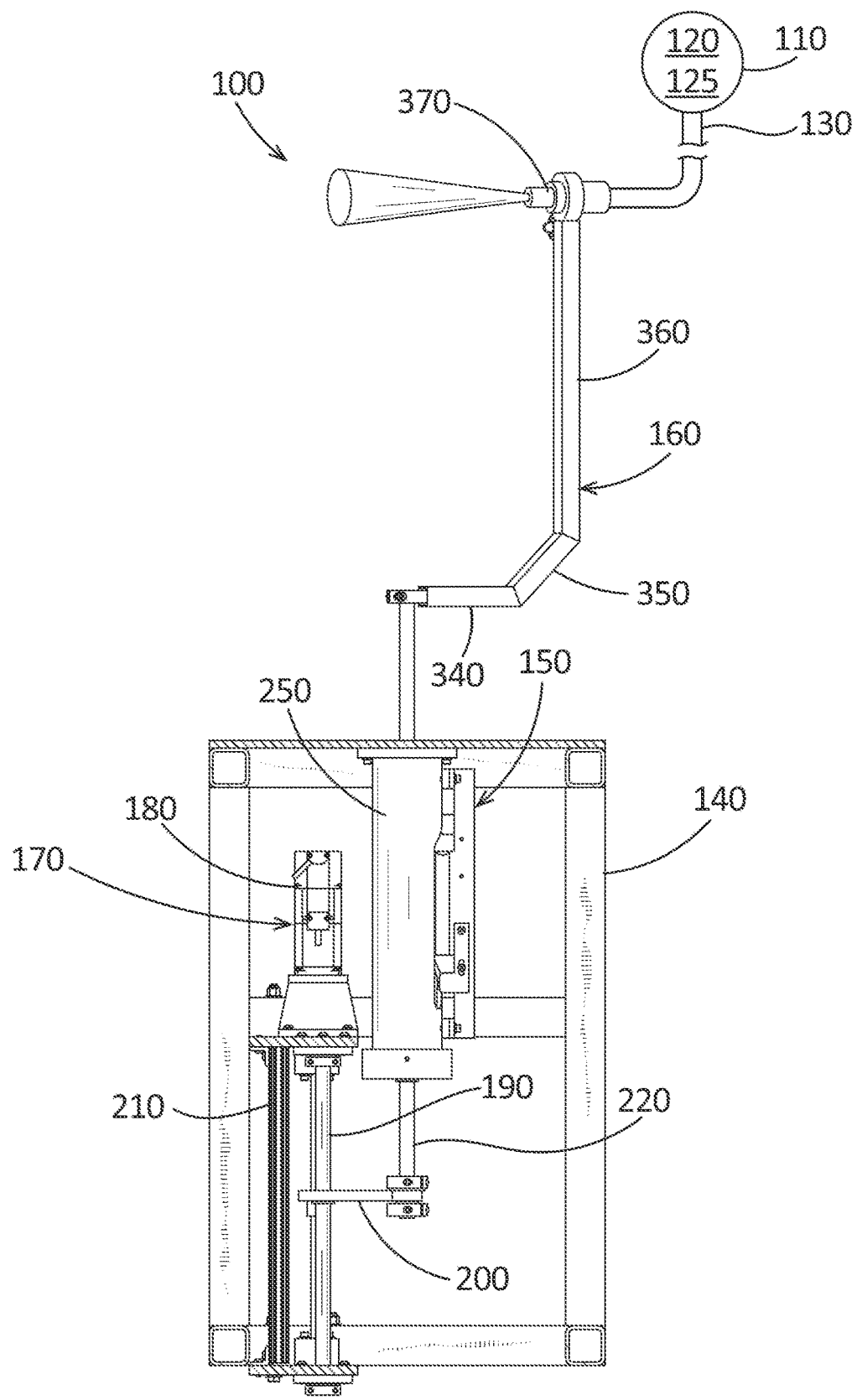
FIG. 4 is a sectional view of the variable spray system of FIG. 3 taken along line 4-4.

As described above, turbine engine rotor blades include an airfoil extending outwardly from a supporting platform and dovetail. To further enhance the strength of the turbine rotor blades, the various surfaces of the dovetails may be shot peened to reduce stresses therein. FIG. 2 shows a workpiece 55 in the form of a gas turbine engine rotor blade 60. The rotor blade 60 includes an airfoil 65 extending outwardly from a supporting platform 70 with an integrally formed dovetail 75. The dovetail 75 may be conventionally configured as an axial-entry dovetail with a number of serrations or dovetail lobes configured for mounting the rotor blade to the perimeter of a supporting rotor disk (not shown) having corresponding axial dovetail slots extending about the perimeter thereof. Other types of rotor blades 60 and the like also may be used herein.

FIGS. 3-6 show an example of a variable spray system 100 as may be described herein. The variable spray system 100 may be used to shot peen a workpiece 55 such as the dovetail 75 of the rotor blade 60 and the like. Other types of workpieces 55 and other types of configurations may be used herein. The variable spray system 100 may be in communication with a shot peen material source 110 with a volume of a shot peen material 120 therein. Other types of a spray-able materials 125 also may be used herein. The variable spray system 100 may be in communication with the shot peen material source 110 via a flexible hose 130 and the like.

The variable spray system 100 includes a frame 140. The frame 140 may have any suitable size, shape, or configuration. A cam follower assembly 150 may be mounted in the frame 140. The cam follower assembly 150 maneuvers a spray arm assembly 160 via a linear actuator 170. The linear actuator 170 may be of conventional design with a drive motor 180 attached to a linear motion shaft 190. The linear motion shaft 190 may raise and lower an attached lift plate 200. The length of travel of the lift plate 200 may be controlled by a limit switch (not shown) positioned within a T-slot mount 210 and the like. Other types of linear drive devices may be used herein. Other components and other configurations may be used herein.

The cam follower assembly 150 includes a vertically driven shaft 220. The shaft 220 may be positioned on the lift plate 200 of the linear actuator 170 for vertical movement therewith. A track roller 230 may be attached to the shaft 220 via a shaft coupling 240. The shaft 220 and the track roller 230 may be positioned within a cam follower tube 250. The cam follower tube 250 defines a track 260 therein. The track 260 may be largely in the shape of a parallelogram 270 with an upward vertical edge 280, and upward angled edge 290, a top recess 300, a downward vertical edge 310, a downward angled edge 320, and a bottom recess 330. The configuration of the track 260 and the edges therein may vary depending upon the desired resulting motion. Specifically, the track roller 230 is driven up and down the upward vertical edge 280 and the downward vertical edge 310 by the shaft 220 while the track roller 230 is driven at an angle along the upward angled edge 290 and the downward angled edge 320. This angled motion causes the track roller 230 to rotate the shaft 220. Other components and other configurations may be used herein.

The spray arm assembly 160 may be attached to the shaft 220 for vertical and rotational movement therewith. In this example, the spray arm assembly 160 may include a horizontal arm 340, an angled arm 350, and a vertical arm 360. The respective lengths of the arms 340, 350, 360 may vary depending on the desired resulting motion. The horizontal arm 340 may be attached to the shaft 220 for movement therewith. The vertical arm 360 may be attached to a spray nozzle 370. The spray nozzle 370 may be in communication with the shot peen material source 110 via the flexible hose 130. The spray nozzle 370 may be of conventional design. Other components and other configurations may be used herein.

In use as is shown in FIG. 7, the variable spray system 100 may be used to spray the shot peen material 120 or other type of spray-able material 125 on to the rotor blade dovetail 75 or other types of workpieces 55. Specifically, the variable spray system 100 may spray the shot peen material 120 from the bottom to the top of one side or at a first angle 380 of the dovetail 75 and then rotate to spray the shot peen material 120 from the top to the bottom of the other side or at a second angle 390 before rotating back to the starting position. In an upward or a first stroke 400, the linear actuator 170 raises the shaft 220 as the track roller 230 travels along the upward vertical edge 280 of the track 260. The linear actuator 170 continues to raise the shaft 220 as the track roller 230 travels along the upward angled edge 290 of the track 260 and the track roller 230 rotates the shaft 220 until the track roller 230 reaches the top recess 300. In a downward or a second stroke 410, the reverse occurs with the linear actuator 170 lowering the shaft 220 as the track roller 230 travels along the downward vertical edge 310 of the track. The linear actuator 170 continues to lower the shaft 220 as the track roller 230 travels along the downward angled edge 320 of the track 260 and the track roller 230 rotates the shaft 220 until the track roller 230 returns to the bottom recess 330.

This motion then may be repeated without any reset as the linear actuator 120 raises and lowers the shaft 220. The reciprocating motion of the linear actuator 170 thus provides vertical and rotation movement to the shaft 220 and, hence, the spray arm assembly 160 and the nozzle 370. The nozzle 370 may make several passes on both sides or to both angles 380, 390 of the dovetail 75 as needed.

The length of each stroke of the linear actuator 170, the length of the vertical edges 280, 310 of the track 260, the length and the angle of the angled edges 290, 320 of the track 260, and the length of the arms 340, 350, 360 of the spray arm assembly 160 all may be varied individually or in combination to change the vertical distance traveled by the nozzle 370 as well as the degrees of rotation of the nozzle 370 about the dovetail 75 or other type of workpiece 55.

The variable spray system 100 thus utilizes the linear actuator 170 and the cam follower assembly 150 to create repetitive rotational actuation, thus simplifying the variable spray system 100 by reducing the number of components therein and, hence, eliminating waste. As described above, two nozzle generally were required for the shot peen process instead of the single nozzle 370 used herein. The combination of the linear actuator 170 and the cam follower assembly 150 may be used in any mechanical actuation application. For example, machines in a manufacturing environment requiring repetitive motion. This combination limits waste (energy, hardware, motion, controls) by utilizing a mechanical mechanism to create controlled rotational motion from linear motion.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A variable spray system for spraying a workpiece with a spray-able material at different angles, comprising: a linear actuator; a cam follower assembly; and a spray arm assembly; wherein the linear actuator drives the cam follower assembly such that the cam follower assembly positions the spray arm assembly at a first angle with respect to the workpiece in a first stroke of the linear actuator and positions the spray arm assembly at a second angle with respect to the workpiece in a second stroke of the linear actuator.
2. The variable spray system of clause 1, wherein the cam follower assembly comprises a shaft extending between the linear actuator and the spray arm assembly.
3. The variable system of any preceding clause, wherein the linear actuator comprises a lift plate and wherein the lift plate raises and lowers the shaft.
4. The variable spray system of any preceding clause, wherein the cam follower assembly comprises a track roller attached to the shaft.
5. The variable spray system of any preceding clause, wherein the cam follower assembly comprises a track and wherein the track roller travels along the track.
6. The variable spray system of any preceding clause, wherein the track comprises a parallelogram shape.
7. The variable spray system of any preceding clause, wherein the track comprises an upward vertical edge, an upward angled edge, a downward vertical edge, and a downward angled edge.
8. The variable spray system of any preceding clause, wherein the track roller travels along the upward vertical edge and the upward angled edge of the track during the first stroke of the linear actuator.
9. The variable spray system of any preceding clause, wherein the track roller causes the shaft to rotate while the track roller travels along the upward angled edge of the track.
10. The variable spray system of any preceding clause, wherein the track roller travels along the downward vertical edge and the downward angled edge of the track during the second stroke of the linear actuator.
11. The variable spray system of any preceding clause, wherein the track roller causes the shaft to rotate while the track roller travels along the downward angled edge of the track.
12. The variable spray system of any preceding clause, wherein the spray arm assembly comprises a nozzle.
13. The variable spray system of any preceding clause, wherein the workpiece comprises a dovetail of a rotor blade.
14. The variable spray system of any preceding clause, wherein the spray-material comprises a shot peen material.
15. A method of positioning a nozzle driven by a shaft of a cam follower assembly at different angles about a workpiece, comprising: driving the shaft in an upward direction; wherein driving the shaft in the upward direction causes the cam follower assembly to rotate the shaft in a first angle; and driving the shaft in a downward direction; wherein driving the shaft in the downward direction causes the cam follower assembly to rotate the shaft in a second angle.
16. A variable spray system for spraying a dovetail of a rotor blade with shot peen at different angles, comprising: a linear actuator; a cam follower assembly; and a spray arm with a nozzle; wherein the linear actuator drives the cam follower assembly such that the cam follower assembly positions the spray arm and the nozzle at a first angle with respect to the dovetail in a first stroke of the linear actuator and positions the spray arm and the nozzle at a second angle with respect to the dovetail in a second stroke of the linear actuator.
17. The variable spray system of any preceding clause, wherein the cam follower assembly comprises a shaft extending between the linear actuator and the spray arm.
18. The variable spray system of any preceding clause, wherein the cam follower assembly comprises a track roller attached to the shaft and wherein the cam follower assembly comprises a track.
19. The variable spray system of any preceding clause, wherein the track comprises an upward vertical edge, an upward angled edge, a downward vertical edge, and a downward angled edge.
20. The variable spray system of any preceding clause, wherein the track roller causes the shaft to rotate in the first angle while the track roller travels along the upward angled edge of the track and wherein the track roller causes the shaft to rotate in the second angle while the track roller travels along the downward angled edge of the track.

We claim:

1. A variable spray system for spraying a workpiece with a spray-able material at different angles, comprising:
   a vertically oriented linear actuator;
   a cam follower assembly; and
   a spray arm assembly;
   wherein the vertically oriented linear actuator drives the cam follower assembly such that the cam follower assembly positions the spray arm assembly at a first angle and a first height with respect to the workpiece in a first stroke of the vertically oriented linear actuator and positions the spray arm assembly at a second angle and a second height with respect to the workpiece in a second stroke of the vertically oriented linear actuator.
2. The variable spray system of claim 1, wherein the cam follower assembly comprises a shaft extending between the vertically oriented linear actuator and the spray arm assembly.
3. The variable spray system of claim 2, wherein the vertically oriented linear actuator comprises a lift plate and wherein the lift plate raises and lowers the shaft.
4. The variable spray system of claim 2, wherein the cam follower assembly comprises a track roller attached to the shaft.
5. The variable spray system of claim 4, wherein the cam follower assembly comprises a track and wherein the track roller travels along the track.
6. The variable spray system of claim 5, wherein the track comprises a parallelogram shape with a pair of parallel vertical edges and a pair of parallel angled edges.
7. The variable spray system of claim 5, wherein the track comprises an upward vertical edge, an upward angled edge, a downward vertical edge, and a downward angled edge.

8. The variable spray system of claim 7, wherein the track roller travels along the upward vertical edge and the upward angled edge of the track during the first stroke of the vertically oriented linear actuator.

9. The variable spray system of claim 8, wherein the track roller causes the shaft to rotate while the track roller travels along the upward angled edge of the track.

10. The variable spray system of claim 7, wherein the track roller travels along the downward vertical edge and the downward angled edge of the track during the second stroke of the vertically oriented linear actuator.

11. The variable spray system of claim 10, wherein the track roller causes the shaft to rotate while the track roller travels along the downward angled edge of the track.

12. The variable spray system of claim 1, wherein the spray arm assembly comprises a nozzle.

13. The variable spray system of claim 1, wherein the workpiece comprises a dovetail of a rotor blade.

14. The variable spray system of claim 1, wherein the spray-able material comprises a shot peen material.

15. A method of positioning a nozzle driven by a shaft of a cam follower assembly at different angles about a workpiece, comprising:
    driving the shaft in an upward direction via a vertically oriented linear actuator;
    wherein driving the shaft in the upward direction causes the cam follower assembly to rotate the shaft in a first angle and raise the nozzle to a first height; and
    driving the shaft in a downward direction via the vertically oriented linear actuator;
    wherein driving the shaft in the downward direction causes the cam follower assembly to rotate the shaft in a second angle and lower the nozzle to a second height.

16. A variable spray system for spraying a dovetail of a rotor blade with shot peen at different angles, comprising:
    a vertically oriented linear actuator;
    a cam follower assembly; and
    a spray arm with a nozzle;
    wherein the vertically oriented linear actuator drives the cam follower assembly such that the cam follower assembly positions the spray arm and the nozzle at a first height and a first angle with respect to the dovetail in a first stroke of the vertically oriented linear actuator and positions the spray arm and the nozzle at a second height and a second angle with respect to the dovetail in a second stroke of the vertically oriented linear actuator.

17. The variable spray system of claim 16, wherein the cam follower assembly comprises a shaft extending between the vertically oriented linear actuator and the spray arm.

18. The variable spray system of claim 17, wherein the cam follower assembly comprises a track roller attached to the shaft and wherein the cam follower assembly comprises a track.

19. The variable spray system of claim 18, wherein the track comprises an upward vertical edge, an upward angled edge, a downward vertical edge, and a downward angled edge.

20. The variable spray system of claim 19, wherein the track roller causes the shaft to rotate in the first angle while the track roller travels along the upward angled edge of the track and wherein the track roller causes the shaft to rotate in the second angle while the track roller travels along the downward angled edge of the track.

* * * * *